United States Patent
Speranza

[19]

[11] Patent Number: 6,056,165
[45] Date of Patent: May 2, 2000

[54] FREE STANDING CORDLESS GUN FOR DISPENSING LIQUID GLUE AND SIMILAR MATERIALS

[76] Inventor: James D. Speranza, 71 Seacliff St., Islip Ter., N.Y. 11752

[21] Appl. No.: 09/176,281

[22] Filed: Oct. 21, 1998

[51] Int. Cl.[7] .................................................. G01F 11/10
[52] U.S. Cl. .......................... 222/333; 222/326; 222/327; 222/390
[58] Field of Search .................................. 222/333, 326, 222/327, 390; 604/154, 155

[56] References Cited

U.S. PATENT DOCUMENTS

| | | | |
|---|---|---|---|
| D. 315,283 | 3/1991 | DeCarolis et al. | D8/71 |
| 3,208,638 | 9/1965 | Frenzel et al. | 222/333 |
| 4,339,058 | 7/1982 | Wendt | 222/326 X |
| 4,692,587 | 9/1987 | Spirk, Jr. et al. | 219/242 |
| 4,787,893 | 11/1988 | Villette | 604/154 X |
| 4,826,049 | 5/1989 | Speer | 222/146.5 |
| 5,236,269 | 8/1993 | Handy | 401/1 |
| 5,269,762 | 12/1993 | Armbruster et al. | 222/155 |
| 5,672,155 | 9/1997 | Riley et al. | 222/155 X |
| 5,688,421 | 11/1997 | Walton | 219/230 |

Primary Examiner—Gregory L. Huson
Assistant Examiner—Thach Bui
Attorney, Agent, or Firm—Richard L. Miller, P. E

[57] ABSTRACT

A free standing cordless gun for dispensing liquid glue that includes a housing that is pistol-shaped and dispensing apparatus that is contained in the housing for dispensing the liquid glue. The liquid glue is dispensed through a muzzle bore in a barrel of the housing, by first depressing a trigger of the dispensing apparatus, which causes a reversible motor of the dispensing apparatus to be powered by a rechargeable battery and rotate in one direction, which causes a shaft of the reversible motor to rotate in the one direction, which causes a first beveled gear of the dispensing apparatus to rotate in the one direction, which causes a second beveled gear of the dispensing apparatus to rotate in the one direction, which causes an internally threaded tube of the dispensing apparatus to rotate in the one direction, in place, in a pair of roller bearing disks of the dispensing apparatus, which causes an externally threaded ram rod of the dispensing apparatus to thread out therefrom and slide outwardly through a pair of guide disks of the dispensing apparatus, which causes a piston of the dispensing apparatus to push upon a cup seal of a cartridge of the dispensing apparatus, which forces the liquid glue out through the muzzle bore in the barrel of the housing.

18 Claims, 2 Drawing Sheets

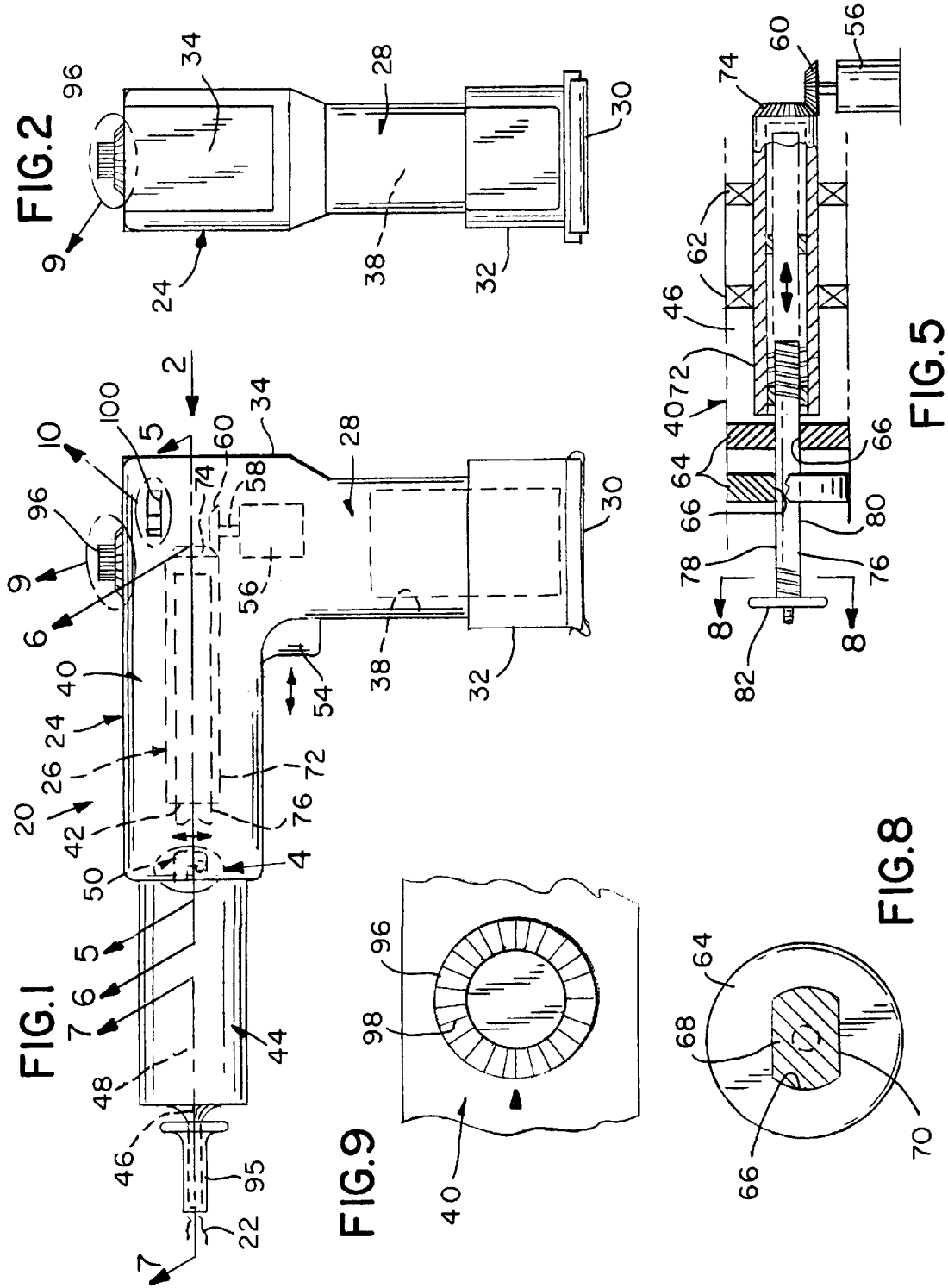

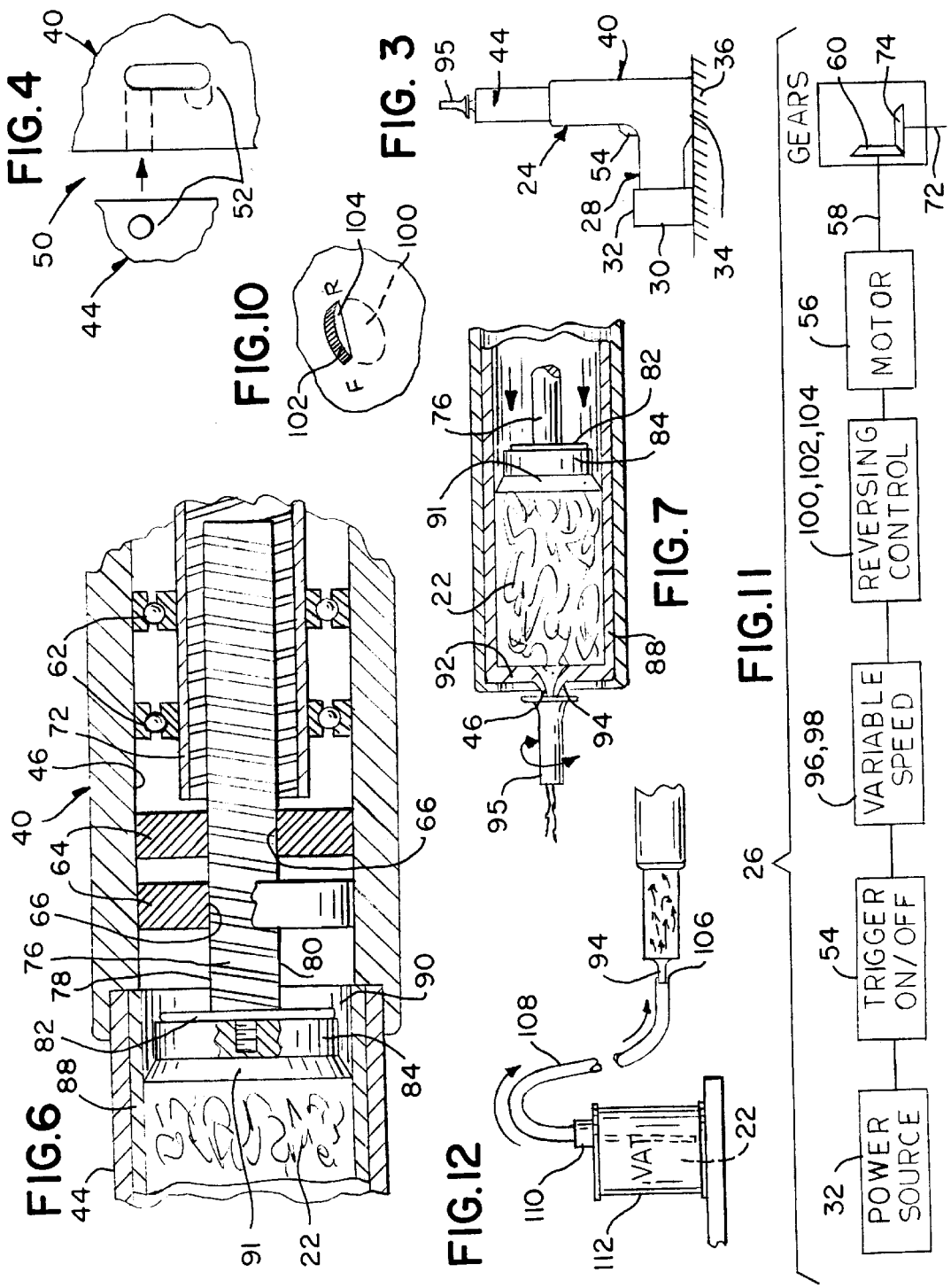

FREE STANDING CORDLESS GUN FOR DISPENSING LIQUID GLUE AND SIMILAR MATERIALS

BACKGROUND OF THE INVENTION

1. Field of the Invention

The present invention relates to a free standing cordless gun. More particularly, the present invention relates to a free standing cordless gun for dispensing liquid glue.

2. Descripton of the Prior Art

Numerous innovations for glue gun related devices have been provided in the prior art that will be described. Even though these innovations may be suitable for the specific individual purposes to which they address, however, they differ from the present invention.

A FIRST EXAMPLE, U.S. Pat. No. Des. 315,283 to De Carolis et al. teaches the ornamental design for a combined cordless glue gun stand and power base therefor.

A SECOND EXAMPLE, U.S. Pat. No. 4,692,587 to Soirk, Jr. et al. teaches a hand tool (implement) such as a glue gun and a support for the hand tool. The support is designed for engaging the hand tool and supporting the hand tool in a manner that enables the hand tool to be conveniently removed therefrom. In the preferred embodiment, the support comprises an upstanding post adapted to engage a first portion of the hand tool. The support includes a special lever which is adapted to exert a prying force upon the first portion of the tool to disengage the tool from the upstanding post. The construction of the tool and the support allows the user to readily disengage and remove the hand tool from the support with a single hand simply by grasping the tool and imparting a slight rocking or rotational force thereto. The tool and support are particularly useful in constructing a cordless glue gun that is electrically energized while on the support and which is conveniently detached from the support and from the source of electricity.

A THIRD EXAMPLE, U.S. Pat. No. 4,826,049 to Speer teaches a cordless adhesive dispensing system that includes an electrically-heated dispensing gun and cooperating base that supports the gun and effects both a mechanical and electrical connection to the gun. The gun accepts solid adhesive and melts the adhesive in response to an electrical current provided to the gun through a mechanical and electrical interface. The electrical interface includes cooperating electrical contacts on both the gun and the base that effect electrical contact as the gun is mounted to the base by the operator and electrical disconnection as the gun is dismounted. A switch is in-circuit with the contacts and closes the circuit to the gun after the gun is fully mounted to the base and effect electrical interruption as the gun is dismounted. The mechanical interface maintains the mounted gun at a convenient, easy-to-grip attitude and includes pivoted interface surfaces that allow the gun to be pivoted into and out of its mechanical and electrical interfacing with the base in a reliable manner.

A FOURTH EXAMPLE, U.S. Pat. No. 5,236,269 to Handy teaches a battery-powered dispenser for hot melt adhesive that includes an elongated housing supporting a battery power source therein. heat exchanger is supported within the housing interior and includes an elongated heat exchanger and a resilient support guide sleeve for receiving a to-be-melted low temperature stick. The heat exchanger includes a discharge nozzle and a recess for receiving and supporting an heating element which is operatively coupled to the battery power source.

A FIFTH EXAMPLE, U.S. Pat. No. 5,688,421 to Walton teaches a low wattage device for heat-liquefying material which employs a low volume mass electrical heat exchanger structure to generate a high power density within a dispensing tip; and simultaneously by actuation of an operator controlled momentary on/off switch for energizing the heat exchanger structure heater, the heat-liquefiable material is pressed into effective contact with the heat exchanger structure. The heat exchanger structure is formed by positioning a resistive heating element in contiguous relation to the outer wall of a low volume thermal conducting mass formed into a heat-liquefying material conductor and generates sufficiently high heat at a relatively low wattage to effectively achieve the desired melting within a few seconds. In a further feature, an insulating shield partially envelopes the heat exchanger structure to prevent contact with the resistive heating element and to minimize heat loss.

It is apparent that numerous innovations for glue gun related devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a free standing cordless gun for dispensing liquid glue that avoids the disadvantages of the prior art.

ANOTHER OBJECT of the present invention is to provide a free standing cordless gun for dispensing liquid glue that is simple and inexpensive to manufacture.

STILL ANOTHER OBJECT of the present invention is to provide a free standing cordless gun for dispensing liquid glue that is simple to use.

BRIEFLY STATED, YET ANOTHER OBJECT of the present invention is to provide a free standing cordless gun for dispensing liquid glue that includes a housing that is pistol-shaped and dispensing apparatus that is contained in the housing for dispensing the liquid glue. The liquid glue is dispensed through a muzzle bore in a barrel of the housing, by first depressing a trigger of the dispensing apparatus, which causes a reversible motor of the dispensing apparatus to be powered by a rechargeable battery and rotate in one direction, which causes a shaft of the reversible motor to rotate in the one direction, which causes a first beveled gear of the dispensing apparatus to rotate in the one direction, which causes a second beveled gear of the dispensing apparatus to rotate in the one direction, which causes an internally threaded tube of the dispensing apparatus to rotate in the one direction, in place, in a pair of roller bearing disks of the dispensing apparatus, which causes an externally threaded ram rod of the dispensing apparatus to thread out therefrom and slide outwardly through a pair of guide disks of the dispensing apparatus, which causes a piston of the dispensing apparatus to push upon a cup seal of a cartridge of the dispensing apparatus, which forces the liquid glue out through the muzzle bore in the barrel of the housing.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic side elevational view of the present invention;

FIG. 2 is a diagrammatic end elevational view taken generally in the direction of arrow 2 in FIG. 1;

FIG. 3 is a reduced diagrammatic side elevational view of the present invention standing on a horizontal surface, eliminating the need for a separate stand;

FIG. 4 is an enlarged diagrammatic side elevational view of the area generally enclosed by the dotted ellipse identified by arrow 4 in FIG. 4 of the bayonet connector of the housing of the present invention;

FIG. 5 is an enlarged diagrammatic cross sectional view taken on line 5—5 in FIG. 1 of the internal components of the present invention;

FIG. 6 is an enlarged diagrammatic cross sectional view taken on line 6—6 in FIG. 1 of the internal components of the present invention;

FIG. 7 is an enlarged diagrammatic cross sectional view taken on line 7—7 in FIG. 1 of the internal components of the present invention;

FIG. 8 is an enlarged diagrammatic cross sectional view taken on line 8—8 in FIG. 5 of the piston of the present invention;

FIG. 9 is an enlarged diagrammatic top plan view of the area generally enclosed by the dotted ellipse identified by arrow 9 in FIGS. 1 and 2 of the variable speed control of the present invention;

FIG. 10 is an enlarged diagrammatic side elevational view of the area generally enclosed in the dotted ellipse identified by arrow 10 in FIG. 1 of the rotation control of the present invention;

FIG. 11 is a block diagram of the present invention; and

FIG. 12 is a diagrammatic side elevational view of the cartridge of the present invention being filled with liquid glue.

LIST OF REFERENCE NUMERALS UTILIZED IN THE DRAWING

| | |
|---|---|
| 20 | free standing cordless gun for dispensing liquid glue of the present invention |
| 22 | liquid glue |
| 24 | housing |
| 26 | dispensing apparatus |
| 28 | handle grip of housing 14 for gripping by hand of user |
| 30 | butt of handle grip 28 of housing 14 for inserting rechargeable battery 32 therein |
| 32 | rechargeable battery |
| 34 | back strap of handle grip 28 of housing 14 for resting on horizontal surface 36 |
| 36 | horizontal surface |
| 38 | chamber in handle grip 28 of housing 14 |
| 40 | cylinder frame of housing 14 |
| 42 | chamber in cylinder frame 40 of housing 14 |
| 44 | barrel of housing 24 |
| 46 | muzzle bore of barrel 44 of housing 24 |
| 48 | chamber in barrel 44 of housing 24 |
| 50 | attaching apparatus |
| 52 | twistable bayonet connector of attaching apparatus 50 |
| 54 | trigger of dispensing apparatus 26 |
| 56 | reversible motor of dispensing apparatus 26 |
| 58 | shaft of reversible motor 56 of dispensing apparatus 26 |
| 60 | first beveled gear of dispensing apparatus 26 |
| 62 | pair of roller bearing disks of dispensing apparatus 26 |

-continued

LIST OF REFERENCE NUMERALS UTILIZED IN THE DRAWING

| | |
|---|---|
| 64 | pair of guide disks of dispensing apparatus 26 |
| 66 | central throughbores in pair of guide disks 64 of dispensing apparatus 26 |
| 68 | upper flats of central throughbores 66 in pair of guide disks 64 of dispensing apparatus 26 |
| 70 | lower flats of central throughbores 66 in pair of guide disks 64 of dispensing apparatus 26 |
| 72 | internally threaded tube of dispensing apparatus 26 |
| 74 | second beveled gear of dispensing apparatus 26 |
| 76 | externally threaded ram rod of dispensing apparatus 26 |
| 78 | upper flat of externally threaded ram rod 76 of dispensing apparatus 26 |
| 80 | lower flat of externally threaded ram rod 76 of dispensing apparatus 26 |
| 82 | load distributing disk on externally threaded ram rod 76 of dispensing apparatus 26 |
| 84 | piston of dispensing apparatus 26 |
| 88 | cartridge of dispensing apparatus 26 |
| 90 | first end of cartridge 88 of dispensing apparatus 26 |
| 91 | cup seal sealing first end 90 of cartridge 88 of dispensing apparatus 26 |
| 92 | second end of cartridge 88 of dispensing apparatus 26 |
| 94 | central throughbore in second end 92 of cartridge 88 of dispensing apparatus 26 |
| 95 | twist cap and nozzle arrangement of dispensing apparatus 26 |
| 96 | variable speed control of dispensing apparatus 26 |
| 98 | exposed knob of variable speed control 96 of dispensing apparatus 26 |
| 100 | rotation control of dispensing apparatus 26 |
| 102 | slide switch of rotation control 100 of dispensing apparatus 26 |
| 104 | exposed knob of slide switch 102 of rotation control 100 of dispensing apparatus 26 |
| 106 | one end of flexible tube 108 |
| 108 | flexible tube |
| 110 | other end of flexible tube 108 |
| 112 | vat of liquid glue 22 |

DETAILED DESCRIPTION OF THE PREFERRED EMBODIMENT

Referring now to the figures, in which like numerals indicate like parts, and particularly to FIG. 1, the free standing cordless gun for dispensing liquid glue of the present invention is shown generally at 20 for dispensing liquid glue 22.

The general configuration of the free standing cordless gun for dispensing liquid glue 20 can best be seen in FIGS. 1–3, and as such, will be discussed with reference thereto.

The free standing cordless gun for dispensing liquid glue 20 comprises a housing 24 that is pistol-shaped and dispensing apparatus 26 contained in the housing 24 and for dispensing the liquid glue 22.

The specific configuration of the housing 24 can best be seen in FIGS. 1–3, and as such, will be discussed with reference thereto.

The housing 24 comprises a handle grip 28 for gripping by a hand of a user, and has a butt 30 for inserting a rechargeable battery 32 therein, and a back strap 34 for resting on a horizontal surface 36 and thereby eliminating a need for a separate stand, and contains a chamber 38.

The housing 24 further comprises a cylinder frame 40 that extends generally perpendicularly forwardly from the handle grip 28 of the housing 24, and contains a chamber 42 that is in communication with the chamber 38 in the handle grip 28 of the housing 24, and together therewith, houses the dispensing apparatus 26.

The housing 24 further comprises a barrel 44 that extends axially forwardly from, and is replaceably attached to, the cylinder frame 40 of the housing 24, and terminates in a muzzle bore 46, and contains a chamber 48 that is in communication with the chamber 42 in the cylinder frame 40 of the housing 24 and which removably contains the liquid glue 22.

The barrel 44 of the housing 24 is replaceably attached to the cylinder frame 40 of the housing 24 by attaching apparatus 50.

The specific configuration of the attaching apparatus 50 can best be seen in FIG. 4, and as such, will be discussed with reference thereto.

The attaching apparatus 50 comprises a twistable bayonet connector 52.

The specific configuration of the dispensing apparatus 26 can best be seen in FIGS. 1, 5–8, and 11, and as such, will be discussed with reference thereto.

The dispensing apparatus 26 comprises a trigger 54 that is movably mounted to the cylinder frame 40 of the housing 24, and when depressed, initiates the dispensing apparatus 26 to dispense the liquid glue 22.

The dispensing apparatus 26 further comprises a reversible motor 56 that is contained axially in the chamber 38 in the handle grip 28 of the housing 24, and has a direction of rotation and a shaft 58 that extends upwardly therefrom, and is in electrical communication with the rechargeable battery 32 and the trigger 54 of the dispensing apparatus, and activated when the trigger 54 of the dispensing apparatus 26 is depressed.

The dispensing apparatus 26 further comprises a first beveled gear 60 that is connected to the shaft 58 of the reversible motor 56 of the dispensing apparatus 26 for rotation therewith.

The dispensing apparatus 26 further comprises a pair of roller bearing disks 62 that are spaced axially apart and radially fill the chamber 46 in the cylinder frame 40 of the housing 24.

The dispensing apparatus 26 further comprises a pair of guide disks 64 that are spaced axially apart and radially fill the chamber 46 in the cylinder frame 40 or the housing 24, and are disposed forwardly of the pair of roller bearing disks 62 of the dispensing apparatus 26.

The pair of guide disks 64 of the dispensing apparatus 26 have central throughbores 66 that are aligned and are defined by upper flats 68 and lower flats 70 that are parallel.

The dispensing apparatus 26 further comprises an internally threaded tube 72 that extends rotatably and axially through the pair of roller bearing disks 62 of the dispensing apparatus 26, from before the pair of guide disks 64 of the dispensing apparatus 26 to the first beveled gear 60 of the dispensing apparatus 26, where it terminates in a second beveled gear 74 that engages with the first beveled gear 60 of the dispensing apparatus 26.

The dispensing apparatus 26 further comprises an externally threaded ram rod 76 that passes slidingly and axially through the central throughbores 66 in the pair of guide disks 64 of the dispensing apparatus 26 and threadably and axially in the internally threaded tube 72 of the dispensing apparatus 26.

The externally threaded ram rod 76 of the dispensing apparatus 26 has an upper flat 78 that extends axially therealong and abuts against the upper flats 68 of the central throughbores 66 in the pair of guide disks 64 of the dispensing apparatus 26, and a lower flat 80 that extends axially therealong and abuts against the lower flats 70 of the central throughbores 66 in the pair of guide disks 64 of the dispensing apparatus 26, which prevents the externally threaded ram rod 76 of the dispensing apparatus 26 from rotating in the pair of guide disks 64 of the dispensing apparatus 26, but allows it to slide therethrough as the internally threaded tube 72 of the dispensing apparatus 26 rotates and threadably moves it.

The externally threaded ram rod 76 of the dispensing apparatus 26 terminates in a load distributing disk 82.

The dispensing apparatus 26 further comprises a piston 84 that is threadably attached to the load distributing disk 82 of the externally threaded ram rod 76 of the dispensing apparatus 26, and which is axially extendable into the barrel 44 of the housing 24.

The dispensing apparatus 26 further comprises a cartridge 88 that contains the liquid glue 22, and extends axially in, and fills, the chamber 48 in the barrel 44 of the housing 24.

The cartridge 88 of the dispensing apparatus 26 has a first end 90 that faces the cylinder frame 40 of the housing 24, and is closed by a cup seal 91 that slides therein and prevents the liquid glue 22 in the cartridge 88 of the dispensing apparatus 26 from leaking out therefrom.

The cartridge 88 of the dispensing apparatus 26 further has a second end 92 that is opposite to the first end 90 of the cartridge 88 of the dispensing apparatus 26, and has a central throughbore 94 that extends axially therethrough and fluidly communicates with the muzzle bore 46 in the barrel 44 of the housing 24, with the liquid glue 22 being dispensed through the muzzle bore 46 in the barrel 44 of the housing 24, by first depressing the trigger 54 of the dispensing apparatus 26, which causes the reversible motor 56 of the dispensing apparatus 26 to be powered by the rechargeable battery 32 and rotate in one direction, which causes the shaft 58 of the reversible motor 56 of the dispensing apparatus 26 to rotate in the one direction, which causes the first beveled gear 60 of the dispensing apparatus 26 to rotate in the one direction, which causes the second beveled gear 74 of the dispensing apparatus 26 to rotate in the one direction, which causes the internally threaded tube 72 of the dispensing apparatus 26 to rotate in the one direction in place in the pair of roller bearing disks 62 of the dispensing apparatus 26, which causes the externally threaded ram rod 76 of the dispensing apparatus 26 to thread out therefrom and slide outwardly through the pair of guide disks 64 of the dispensing apparatus 26, which causes the piston 84 of the dispensing apparatus 26 to push upon the cup seal 91 of the cartridge 88 of the dispensing apparatus 26, which forces the liquid glue 22 out through the muzzle bore 46 in the barrel 44 of the housing 24.

The dispensing apparatus further comprises a twist cap and nozzle arrangement 95 that is operatively connected to the barrel 44 of the housing 24 and selectively opens and closes the muzzle bore 46 in the barrel 44 of the housing 24, and when closed, prevents the liquid glue 22 in the cartridge 88 of the dispensing apparatus 26 from leaking out therefrom.

The dispensing apparatus 26 further comprises a variable speed control 96 that varies the speed of the reversible motor 56 of the dispensing apparatus 26.

The specific configuration of the variable speed control 96 of the dispensing apparatus 26 can best be seen in FIG. 9, and as such, will be discussed with reference thereto.

The variable speed control 96 of the dispensing apparatus 26 is a potentiometer housed in the cylinder frame 40 of the housing 24 and is in electrical communication with the reversible motor 56 of the dispensing apparatus 26, and has an exposed knob 98 for rotation thereof.

The dispensing apparatus 26 further comprises a rotation control 100 that changes the direction of rotation of the reversible motor 56 of the dispensing apparatus 26.

The specific configuration of the rotation control 100 of the dispensing apparatus 26 can best be seen in FIG. 9, and as such, will be discussed with reference thereto.

The rotation control 100 is a slide switch 102 housed in the cylinder frame 40 of the housing 24 and is in electrical communication with the reversible motor 56 of the dispensing apparatus 26, and has an exposed knob 104 for sliding thereof, and when slid to reverse and the trigger 54 of the dispensing apparatus 26 is depressed, the reversible motor 56 of the dispensing apparatus 26 is caused to be powered by the rechargeable battery 32 and rotate in the other direction, which causes the shaft 58 of the reversible motor 56 of the dispensing apparatus 26 to rotate in the other direction, which causes the first beveled gear 60 of the dispensing apparatus 26 to rotate in the other direction, which causes the second beveled gear 74 of the dispensing apparatus 26 to rotate in the other direction, which causes the internally threaded tube 72 of the dispensing apparatus 26 to rotate in the other direction in place in the pair of roller bearing disks 62 of the dispensing apparatus 26, which causes the externally threaded ram rod 76 of the dispensing apparatus 26 to thread in thereto and slide inwardly through the pair of guide disks 64, which causes the piston 84 of the dispensing apparatus 26 to leave the cup seal 91 of the cartridge 88 of the dispensing apparatus 26 and clear the cartridge 88 of the dispensing apparatus 26, with the cartridge 88 of the dispensing apparatus 26 being changed by undoing the bayonet connector 52 of the attaching apparatus 50 and removing the spent cartridge 88 of the dispensing apparatus 26 from the barrel 44 of the housing 26.

The spent cartridge 88 of the dispensing apparatus 26 is one of pre-filled and on-site filled.

The configuration for on-site filling of the spent cartridge 88 of the dispensing apparatus 26 can best be seen in FIG. 12, and as such, will be discussed with reference thereto.

The spent cartridge 88 of the dispensing apparatus 26 is on-site filled by first attaching one end 106 of a flexible tube 108 to the twist cap and nozzle arrangement 95 of the dispensing apparatus 26 when opened, and then operatively connecting the other end 110 of the flexible tube 108 to a vat 112 of the liquid glue 22.

It will be understood that each of the elements describe above, or two or more together, may also find a useful application in other types of constructions differing from the types described above.

While the invention has been illustrated and described as embodied in a free standing cordless gun for dispensing liquid glue, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A free standing cordless gun for dispensing liquid glue, comprising:

a) a housing being pistol-shaped; said housing comprising a handle grip for gripping by a hand of a user, and having a butt for inserting a rechargeable battery therein, and a back strap for resting on a horizontal surface and thereby eliminating a need for a separate stand, and containing a first chamber; and b) dispensing apparatus contained in said housing for dispensing the liquid glue; said housing further comprising a cylinder frame extending generally perpendicularly forwardly from said handle grip of said housing, and containing a second chamber being in communication with said first chamber in said handle grip of said housing, and together therewith, housing said dispensing apparatus; said housing further comprising a barrel extending axially forwardly from, and being replaceably attached to, said cylinder frame of said housing, and terminating in a muzzle bore, and containing a third chamber being in communication with said second chamber in said cylinder frame of said housing and removably containing the liquid glue; said barrel of said housing being replaceably attached to said cylinder frame of said housing by attaching apparatus; said attaching apparatus comprising a twistable bayonet connector; said dispensing apparatus comprising a trigger being movably mounted to said cylinder frame of said housing, and when depressed, initiating said dispensing apparatus to dispense the liquid glue; said dispensing apparatus further comprising a reversible motor being contained axially in said first chamber in said handle grip of said housing, and having a direction of rotation, a speed, and a shaft extending upwardly therefrom, and being in electrical communication with the rechargeable battery and said trigger of said dispensing apparatus, and activating when said trigger of said dispensing apparatus is depressed; said dispensing apparatus further comprising a first beveled gear being connected to said shaft of said reversible motor of said dispensing apparatus for rotation therewith; said dispensing apparatus further comprising a pair of roller bearing disks being spaced axially apart and radially filling said second chamber in said cylinder frame of said housing.

2. The gun as defined in claim 1, wherein said dispensing apparatus further comprises a pair of guide disks that are spaced axially apart and radially fill said second chamber in said cylinder frame of said housing, and are disposed forwardly of said pair of roller bearing disks of said dispensing apparatus.

3. The gun as defined in claim 2, wherein said pair of guide disks of said dispensing apparatus have central throughbores that are aligned and are defined by upper flats and lower flats that are parallel.

4. The gun as defined in claim 3, wherein said dispensing apparatus further comprises an internally threaded tube that extends rotatably and axially through said pair of roller bearing disks of said dispensing apparatus, from before said pair of guide disks of said dispensing apparatus to said first beveled gear of said dispensing apparatus, where it terminates in a second beveled gear that engages with said first beveled gear of said dispensing apparatus.

5. The gun as defined in claim 4, wherein said dispensing apparatus further comprises an externally threaded ram rod that passes slidingly and axially through said central throughbores in said pair of guide disks of said dispensing apparatus and threadably and axially in said internally threaded tube of said dispensing apparatus.

6. The gun as defined in claim 5, wherein said externally threaded ram rod of said dispensing apparatus has an upper flat that extends axially therealong and abuts against said upper flats of said central throughbores in said pair of guide disks of said dispensing apparatus, and a lower flat that extends axially therealong and abuts against said lower flats of said central throughbores in said pair of guide disks of said dispensing apparatus, which prevents said externally threaded ram rod of said dispensing apparatus from rotating in said pair of guide disks of said dispensing apparatus, but allows it to slide therethrough as said internally threaded tube of said dispensing apparatus rotates and threadably moves it.

7. The gun as defined in claim 5, wherein said externally threaded ram rod of said dispensing apparatus terminates in a load distributing disk.

8. The gun as defined in claim 7, wherein said dispensing apparatus further comprises a piston that is threadably attached to said load distributing disk of said externally threaded ram rod of said dispensing apparatus, and which is axially extendable into said barrel of said housing.

9. The gun as defined in claim 8, wherein said dispensing apparatus further comprises a cartridge that contains the liquid glue, and extends axially in, and fills, said third chamber in said barrel of said housing.

10. The gun as defined in claim 9, wherein said cartridge of said dispensing apparatus has a first end that faces said cylinder frame of said housing, and which is closed by a cup seal that slides therein and prevents the liquid glue in said cartridge of said dispensing apparatus from leaking out therefrom.

11. The gun as defined in claim 10, wherein said cartridge of said dispensing apparatus further has a second end that is opposite to said first end of said cartridge of said dispensing apparatus, and which has a central throughbore that extends axially therethrough and fluidly communicates with said muzzle bore in said barrel of said housing, with the liquid glue being dispensed through said muzzle bore in said barrel of said housing, by first depressing said trigger of said dispensing apparatus, which causes said reversible motor of said dispensing apparatus to be powered by the rechargeable battery and rotate in one direction, which causes said shaft of said reversible motor of said dispensing apparatus to rotate in said one direction, which causes said first beveled gear of said dispensing apparatus to rotate in said one direction, which causes said second beveled gear of said dispensing apparatus to rotate in said one direction, which causes said internally threaded tube of said dispensing apparatus to rotate in said one direction, in place, in said pair of roller bearing disks of said dispensing apparatus, which causes said externally threaded ram rod of said dispensing apparatus to thread out therefrom and slide outwardly through said pair of guide disks of said dispensing apparatus, which causes said piston of said dispensing apparatus to push upon said cup seal of said cartridge of said dispensing apparatus, which forces the liquid glue out through said muzzle bore in said barrel of said housing.

12. The gun as defined in claim 9, wherein said dispensing apparatus further comprises a twist cap and nozzle arrangement that is operatively connected to said barrel of said housing and selectively opens and closes said muzzle bore in said barrel of said housing, and when closed, prevents the liquid glue in said cartridge of said dispensing apparatus from leaking out therefrom.

13. The gun as defined in claim 1, wherein said dispensing apparatus further comprises a variable speed control that varies said speed of said reversible motor of said dispensing apparatus.

14. The gun as defined in claim 13, wherein said variable speed control of said dispensing apparatus is a potentiometer housed in said cylinder frame of said housing and is in electrical communication with said reversible motor of said dispensing apparatus, and has an exposed knob for rotation thereof.

15. The gun as defined in claim 11, wherein said dispensing apparatus further comprises a rotation control that change said direction of rotation of said reversible motor of said dispensing apparatus.

16. The gun as defined in claim 15, wherein said rotation control is a slide switch housed in said cylinder frame of said housing and is in electrical communication with said reversible motor of said dispensing apparatus, and has an exposed knob for sliding thereof, and when slid to reverse and said trigger of said dispensing apparatus is depressed, said reversible motor of said dispensing apparatus is caused to be powered by the rechargeable battery and rotate in the other direction, which causes said shaft of said reversible motor of said dispensing apparatus to rotate in said other direction, which causes said first beveled gear of said dispensing apparatus to rotate in said other direction, which causes said second beveled gear of said dispensing apparatus to rotate in said other direction, which causes said internally threaded tube of said dispensing apparatus to rotate in said other direction, in place, in said pair of roller bearing disks of said dispensing apparatus, which causes said externally threaded ram rod of said dispensing apparatus to thread in thereto and slide inwardly through said pair of guide disks, which causes said piston of said dispensing apparatus to leave said cup seal of said cartridge of said dispensing apparatus and clear said cartridge of said dispensing apparatus, with said spent cartridge of said dispensing apparatus then being changed by undoing said bayonet connector of said attaching apparatus and removing said spent cartridge of said dispensing apparatus from said barrel of said housing.

17. The gun as defined in claim 9, wherein said spent cartridge of said dispensing apparatus is one of pre-filled and on-site filled.

18. The gun as defined in claim 17, wherein said on-site fill of said spent cartridge of said dispensing apparatus comprises a flexible tube having one end thereof attached to said twist cap and nozzle arrangement of said dispensing apparatus, when opened, and the other end thereof operatively connected to a vat of the liquid glue.

* * * * *